(12) United States Patent
Bravo

(10) Patent No.: US 9,737,118 B2
(45) Date of Patent: Aug. 22, 2017

(54) ADJUSTABLE LINK FOR BRACELETS

(71) Applicant: The Swatch Group Research and Development Ltd, Marin (CH)

(72) Inventor: Paulo Bravo, Marin-Epagnier (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 15/237,860

(22) Filed: Aug. 16, 2016

(65) Prior Publication Data

US 2017/0105493 A1    Apr. 20, 2017

(30) Foreign Application Priority Data

Oct. 14, 2015 (EP) .................................. 15189844

(51) Int. Cl.
| | | |
|---|---|---|
| *F16G 13/00* | (2006.01) | |
| *A44C 5/00* | (2006.01) | |
| *A44C 5/08* | (2006.01) | |
| *A44C 5/04* | (2006.01) | |

(52) U.S. Cl.
CPC .............. *A44C 5/0069* (2013.01); *A44C 5/04* (2013.01); *A44C 5/08* (2013.01); *F16G 13/00* (2013.01)

(58) Field of Classification Search
CPC ......... F16G 13/00; A44C 5/04; A44C 5/0069; A44C 5/08
USPC ................................................... 59/82; 63/4
See application file for complete search history.

(56) References Cited

U.S. PATENT DOCUMENTS 8,776,492 B2 * 7/2014 Knuchel ................. A44C 5/02
                                                                59/79.1
2013/0319042 A1   12/2013 Knuchel

FOREIGN PATENT DOCUMENTS

| CH | 699 067 A1   | 1/2010 |
| CH | 707 523 A2   | 7/2014 |
| EP | 2 484 244 A1 | 8/2012 |

OTHER PUBLICATIONS

European Search Report issued Mar. 9, 2016 in European Application 15189844, filed on Oct. 14, 2015 ( with English Translation of Categories of cited documents).

* cited by examiner

*Primary Examiner* — David B Jones
(74) *Attorney, Agent, or Firm* — Oblon, McClelland, Maier & Neustadt, L.L.P.

(57) ABSTRACT

An adjustable link for bracelets, including a first half link and a second half link arranged to be assembled to move with respect to each other, including an adjustment, and a locking mechanism cooperating with a complementary locking mechanism in order to form a captive assembly. The adjustment includes a screw, a hole passing through the first half link, and a blind threaded hole extending into the second half link, the through hole and the blind threaded hole facing each other, and being arranged to cooperate with the screw to continuously adjust the position of the first half link and of the second half link in the longitudinal direction in order to adjust the position between a maximum position and a minimum position.

11 Claims, 4 Drawing Sheets

ADJUSTABLE LINK FOR BRACELETS

This application claims priority from European Patent application 15189844.2 of Oct. 14, 2015, the entire disclosure of which is hereby incorporated herein by reference.

FIELD OF THE INVENTION

The invention concerns an adjustable link for bracelets, including at least a first half link and at least a second half link arranged to be movably assembled in relation to each other in a longitudinal direction of the bracelet.

BACKGROUND OF THE INVENTION

Generally, a bracelet can be adjusted into predetermined positions which allow for precise repositioning, and which the user can adjust through the cooperation of a finger with one among a plurality of holes, or by hooking a pin onto a rack, or a similar device. Fastenings of the continuous type, maintained in position by friction, do not offer the possibility of precise repositioning.

There is known from CH Patent No 699067 a device for finely adjusting the length of a bracelet incorporated in a clasp cover, and comprising a device for indexing in two predefined positions, and which includes spring ball push buttons which are integral with a transverse bar, connected to one end of the bracelet and arranged to cooperate with holes provided in the clasp cover.

This device acts transversely, generally requires a tool to perform the adjustment, and remains visible.

There is also known from EP Patent 2484244 an adjustable link for bracelets, including at least a first half link and at least a second half link arranged to be movably assembled in relation to each other in a longitudinal direction of the bracelet, with a mechanism that can be adjusted without any particular tools, wherein the adjustment mechanism remains concealed.

This device does not permit a fine continuous adjustment of the position of the half-links and allows an opening to be seen in the connecting piece between the half-links, which detracts from the appearance of the bracelet. Further, the link can come undone in the event of a shock, since there is nothing to ensure that the adjustment is reliably locked.

SUMMARY OF THE INVENTION

It is an object of the invention to overcome the various drawbacks of these known techniques.

More specifically, it is an object of the invention to provide an adjustable link offering a fine and continuous adjustment of the length of the bracelet strands without detracting from the aesthetic appearance of the bracelet.

It is also an object of the invention, at least in a particular embodiment, to provide an adjustable link that does not require tools, that is simple to implement and inexpensive.

These objects, in addition to others that will appear more clearly hereinafter, are achieved according to the invention with the aid of an adjustable link for bracelets, comprising at least a first half link and at least a second half link arranged to be movably assembled relative to each other in a longitudinal direction of the bracelet, comprising adjustment means.

According to the invention, the link comprises locking means cooperating with complementary locking means to form a captive assembly, and the first half link comprises a through hole extending in the longitudinal direction of the first half link, the second half link comprises a threaded hole extending in the longitudinal direction of the second half link, the through hole and the threaded hole being aligned in the longitudinal direction, the adjustment means comprising a screw passing through the through hole and screwed into the threaded hole to cause the first half link to move in translation with respect to the second half link in the longitudinal direction when the screw is implemented.

Thus, the object of the present invention, by means of the different functional and structural aspects described above, is to obtain a relatively compact adjustable link which still has a long travel length.

In accordance with other advantageous variants of the invention:
- the first half link comprises means of axially maintaining the screw so that the screw is immovable in translation in the longitudinal direction;
- the continuous adjustment means comprise elastic return means disposed between the through hole and the threaded hole, so as to maintain in position the first half link with respect to the second half link;
- the threaded hole comprises a first section of diameter D, and a second section of diameter d smaller than diameter D of the first section, the first section forming a housing for a first end of the spring so as to rest on the second half link;
- the first half link comprises, in immediate proximity to the through hole, a countersunk portion configured to receive the screw head;
- the housing comprises stop means configured to cooperate with complementary stop means of the screw head;
- the locking means and the complementary locking means comprise a catch, integral with the first half link, and a housing, integral with the second half link, configured to receive the catch and to form the captive assembly between the first half link and the second half link;
- the catch is elastically deformable to allow the first half link and the second half link to be disassembled and to allow a half link to be changed;
- the catch is movable in the housing in the longitudinal direction of the bracelet;
- the adjustment means have an adjustment travel comprised between 0 mm and 3 mm.

The invention also concerns a bracelet strand including at least one adjustable link according to the invention.

BRIEF DESCRIPTION OF THE DRAWINGS

Other characteristics and advantages of the invention will appear more clearly upon reading the following description of a specific embodiment of the invention, given simply by way of illustrative and non-limiting example, and the annexed Figures, among which.

DETAILED DESCRIPTION OF PREFERRED EMBODIMENTS

Figure 1:
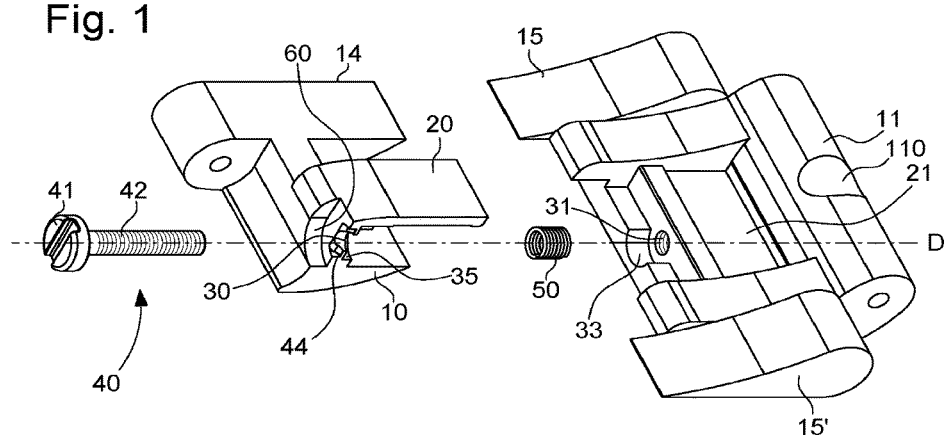
FIG. 1 is an exploded view of an adjustable link according to the invention.

An adjustable link according to a first particular embodiment will now be described below with reference jointly to FIGS. 1, 2a, 2b, 3, 4a, 4b, 5a and 5b.

The invention is described here for the simplified and non-limiting case of two complementary half links that can move in relation to each other, and it is naturally possible to make an adjustable link according to the invention which comprises more elements moving in relation to each other.

Link 1 is formed by a first half link 10 and a second half link 11 assembled to each other. First half link 10 and second half link 11 are assembled to form a captive assembly, through the cooperation of locking means and complementary locking means.

According to the invention, the locking means and complementary locking means comprise a catch 20, integral with first half link 10, and a recessed part 21, integral with second half link 20, configured to receive catch 20 and to form the captive assembly between first half link 10 and second half link 11.

As can be observed in the Figures, first half link 10 comprises at least one catch 20 forming the lower face of half link 10 and extending in longitudinal direction D. End 22 of catch 20 forms a stop means delimiting the minimum travel and the maximum travel of first half link 10 with respect to second half link 11.

Second half link 11 comprises, in a complementary manner, a recessed part 21, of complementary shape to catch 20, and formed in the thickness of second half link 11. As represented in the Figures, recessed part 21 is of rectangular shape and extends in longitudinal direction D, and is configured to permit the displacement of catch 20 in the lengthwise direction of recessed part 21. The length of recessed part 21 is delimited by vertical walls cooperating with end 22 of catch 20.

Catch 20, forming the upper face of first half link 10, and the lower face of first half link 10 form a housing configured to receive second half link 11, in recessed part 21. Second half link 11 is thus covered by the upper face of first half link 10 regardless of the distance between the two half links 10 and 11; such an arrangement makes it possible to avoid an opening between half links 10 and 11 and provides a satisfactorily attractive appearance.

To assemble half links 10 and 11 to each other, first half link 10 simply needs to be locked to second half link 11 such that catch 20 is housed inside recessed part 21, half links 10 and 11 then form a captive assembly and can slide face to face relative to each other, catch 20 being movable in recessed part 21 in longitudinal direction D of the bracelet.

Advantageously, catch 20 is elastically deformable to enable first half link 10 to be disassembled from second half link 11 and to allow a half link to be changed if necessary.

According to the invention, link 1 comprises means for continuous adjustment of the position of first half link 10 and second half link 11 in longitudinal direction D of the bracelet in order to adjust the desired position between a maximum position and minimum position and to obtain the proper bracelet length for the user.

As described hereinbefore, first half link 10 comprises a through hole 30 extending in longitudinal direction D, and second half link 11 comprises a blind threaded hole 31 extending in longitudinal direction D, through hole 30 and blind threaded hole 31 being aligned in longitudinal direction D, substantially opposite each other to cooperate with the continuous adjustment means.

As observed in the Figures, the continuous adjustment means comprise, on the one hand, a screw 40 provided with a head 41 and a threaded body 42 and, on the other hand, a thread 32 made in blind threaded hole 31 to cooperate with threaded body 42 of screw 40, screw 40 being arranged to be inserted in succession through hole 30 of first half link 10 and then screwed into blind threaded hole 31 of second half link 11.

Advantageously, the continuous adjustment means comprise elastic return means, such as a spring 50, disposed between through hole 30 and blind threaded hole 31, screw 40 passing through spring 50, so as to maintain in position first half link 10 with respect to second half link 11 when they are spaced apart from each other.

Figure 2A:
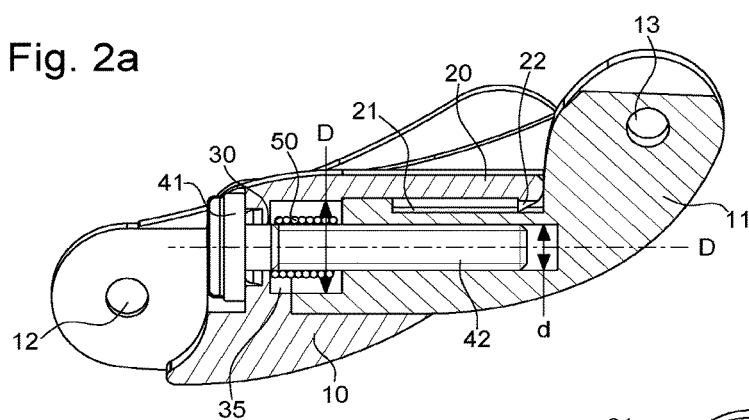
FIGS. 2a and 2b are respectively cross-sectional views of an adjustable link according to the invention in a retracted position and in a deployed position.
Figure 2B:
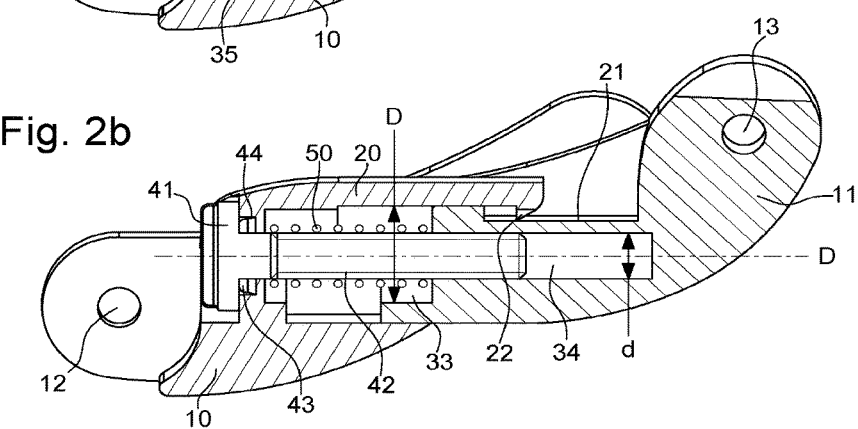

As illustrated in FIGS. 2a and 2b, blind threaded hole 31 comprises a first section 33 of diameter D, and a second section 34 of diameter d smaller than diameter D of first section 33. First section 33 forms a housing configured to receive a first end of spring 50 so that spring 50 rests on the bottom of first section 33, and thus implicitly on second half link 11.

Through hole 30 also comprises a section of diameter D greater than the diameter of through hole 30 to form a complementary housing 35 configured to receive the other end of spring 50. Thus, spring 50 is housed between first half link 10 and second half link 11, and traversed by screw 40, in order to be compressed or relaxed when half links 10 and 11 are moved nearer to or farther from each other.

According to an embodiment of the invention, the adjustment travel is comprised between 0 mm and 3 mm. First half link 10 may, for example, be displaced by 1 mm with respect to second half link 11. Naturally, first half link 10 can take a multitude of positions between 0 and 3 mm, for example, 0.2 mm or 2.7 mm.

Figure 4A:
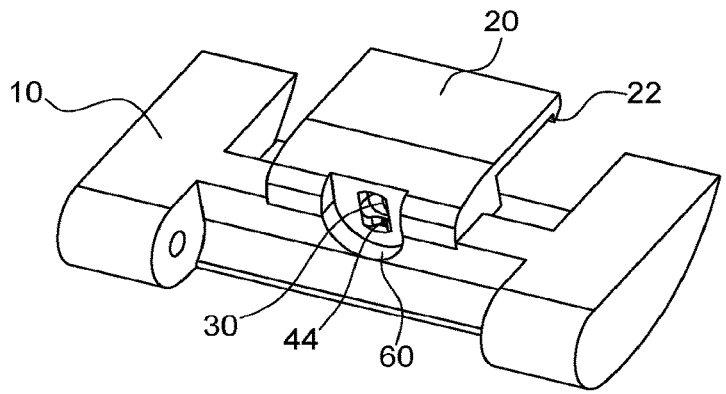
FIGS. 4a and 4b are respectively perspective views of a first half link and of a second half link according to the invention.

As can be observed in FIG. 4a, first half link 10 comprises, in immediate proximity to through hole 30, a countersunk or recessed portion 60 configured to receive the head 41 of screw 40. This countersunk portion 60 has the advantage of facilitating access to screw head 41 to perform the adjustment. One could, for example, envisage a screw head 41 with notches on its periphery to facilitate manual adjustment.

Link 1 according to the invention comprises means for blocking screw 40 and complementary blocking means.

Advantageously, countersunk portion 60 receives the blocking means configured to cooperate with complementary blocking means of screw head 41.

The blocking means comprise at least one lug 43 formed behind screw head 41, in immediate proximity to threaded body 42 of screw 40, the at least one lug 43 being configured to cooperate with the complementary blocking means formed by at least one housing 44 of complementary shape to lug 43. The at least one housing 44 is formed at the entry to through hole 30, in a countersunk portion 60 for head 41 of screw 40.

Figure 3:
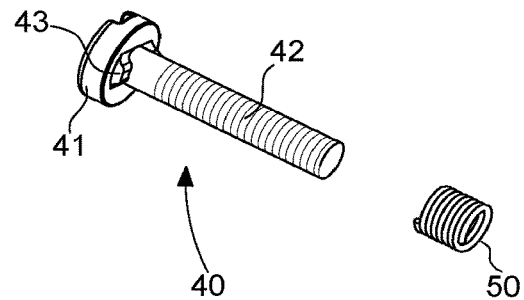
FIG. 3 is a perspective view of a screw.

As represented in FIGS. 3 and 4a, screw 40 has two lugs 43, and the complementary blocking means comprise two housings 44. Such an arrangement allows screw 40 to be locked with every 180° rotation in the clockwise or anti-clockwise direction.

The blocking means and the complementary blocking means together define at least one locked position of screw 40 to hold screw 40 in place. As screw 40 can take a plurality of positions, it can therefore take a plurality of locking positions.

To change from the locked position to the unlocked position, screw 40 is tightened or loosened to dislodge the at least one lug 43 from its housing 44 and thus to move half links 10 and 11 closer together or further apart. As shown in the Figures, lugs 43 and housings 44 lock the position of screw 40 every half-rotation. By way of example, a half-rotation of screw 40 may correspond to a displacement of 0.05 mm of first half link 10 with respect to second half link 11.

As can be seen in the Figures, each half link 10 and 11 comprises decorative elements 14, 14', 15 and 15' on its lateral surfaces. These decorative elements 14, 14', 15 and 15' cooperate with each other by sliding on their flat surface when half links 11 and 10 are moved, and enable the adjustment and locking means to be concealed.

When half links 10 and 11 are assembled to each other, decorative elements 14, 14', 15 and 15' are pressed against each other on their flat surface.

Figure 4B:
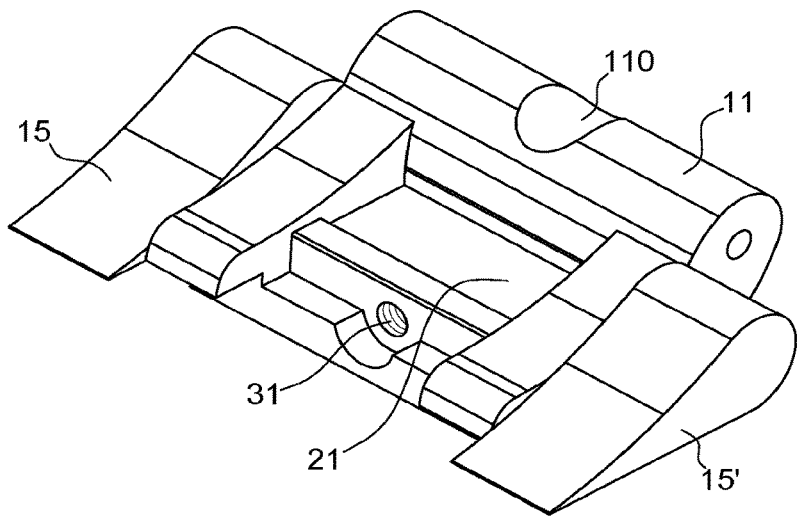

As can be observed in FIGS. 1 and 4b, second half link 11 has a bore 110 configured to allow screw head 41 to pass when another half link is assembled to second half link 11.

This type of assembly permits extremely easy assembly of half links 10 and 11 to each other, and fast, reliable and precise adjustment of the useful length of the bracelet strand.

For the attachment thereof to a bracelet or to a piece of jewellery or timepiece, each half link 10, 11 comprises a means 12, 13 of attachment to another half link, to a watch case between the horns, or to a clasp.

Figure 6A:
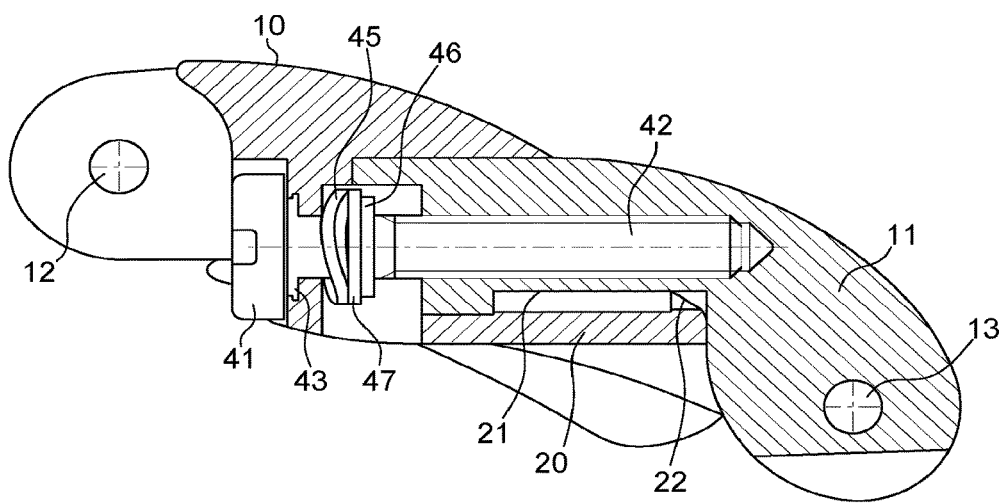
FIGS. 6a and 6b are respectively a cross-sectional view of a first half link and of a second half link according to a second embodiment and a perspective view of a screw according to the second embodiment.

An adjustable link according to a second particular embodiment will now be described below with reference jointly to FIGS. 6a and 6b.

In this second embodiment, first half link 10 and second half link 20 are virtually identical. As can be seen in FIG. 6a, first and second half links 10 and 20 exhibit a countersunk or recessed portion in order to place means for the axial holding of screw 40 such that screw 40 is immovable in translation in longitudinal direction D.

Figure 6B:
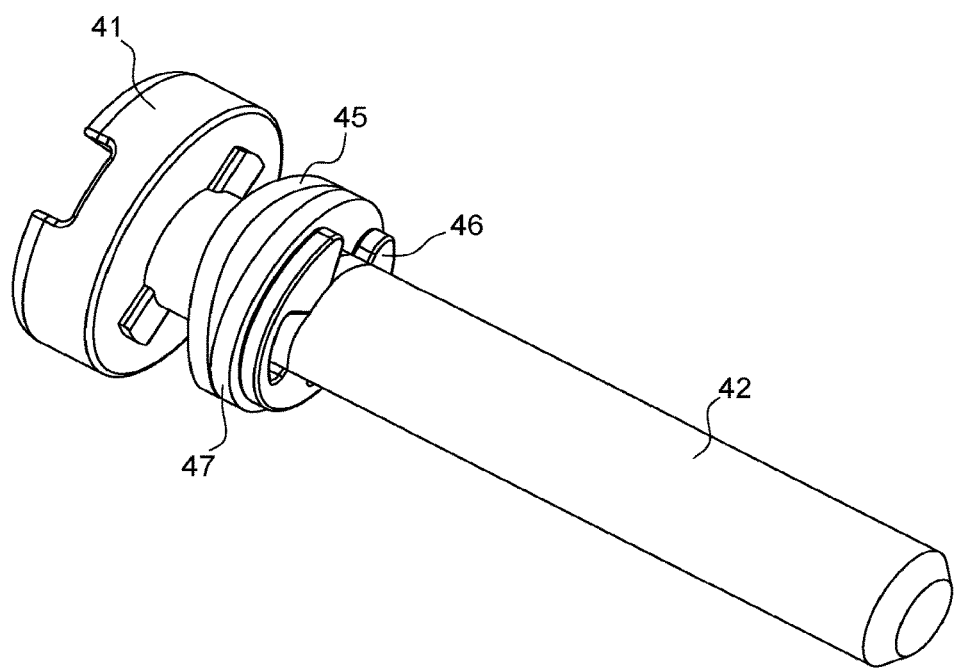

As can be observed in more detail in FIG. 6b, the means for the axial holding of screw 40 comprise a retaining ring 46 fixed to shaft 42, in proximity to head 41, retaining ring 46 forming a stop for an intermediate washer 47 and a spring washer 45.

As a result of this arrangement, screw 40 is locked in translation and cannot be unscrewed from first half link 10, as spring washer 45 prevents any inadvertent loosening of screw 40 with respect to second half link 11.

Figure 5A:
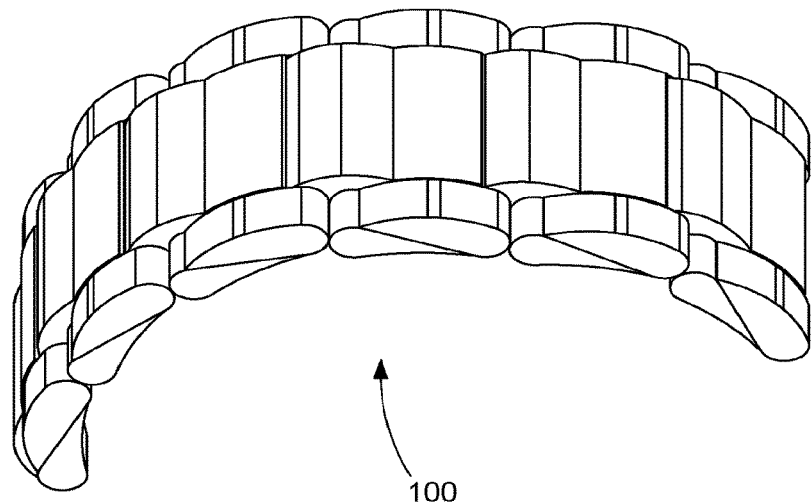
FIGS. 5a and 5b are perspective views of a bracelet strand including at least one adjustable link according to the invention.
Figure 5B:
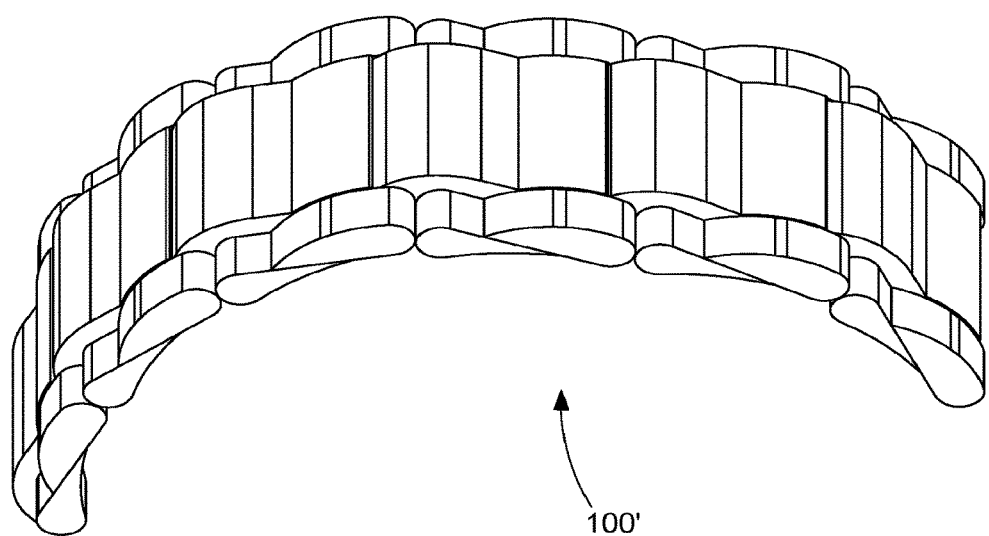

The invention also concerns at least one bracelet strand comprising at least one adjustable link according to the invention. Such a strand is represented in FIGS. 5a and 5b, the Figures respectively illustrating a bracelet strand 100 exhibiting its minimum length and a bracelet strand 100' exhibiting its maximum length.

As a result of the various aspects of the invention, there is obtained an adjustable link 1 of simple design allowing its length of travel to be easily adjusted and therefore allowing the length of bracelet strands 100, 100' to be just as easily adjusted.

Of course, the present invention is not limited to the illustrated example and is capable of various variants and modifications that will appear to those skilled in the art.

LIST OF PARTS

1. Adjustable link
10. First half link
11. Second half link
12, 13. Means of attachment
14, 14'. Decorative elements of the first half link
15, 15'. Decorative elements of the second half link
20. Catch
21. Recessed part,
22. Catch end
30. Through hole 78
31. Blind threaded hole
32. Thread
33. First section of diameter D
34. Second section of diameter d
35. Housing
40. Screw,
41. Screw head
42. Threaded body
43. Lugs
44. Housings,
45. Spring washer
46. Retaining ring
47. Intermediate washer
50. Spring,
60. Countersunk or recessed portion
100, 100. Bracelet strands
110. Bore
D. Longitudinal direction of the bracelet

What is claimed is:

1. An adjustable link for a bracelet, comprising at least a first half link and at least a second half link arranged to be assembled to move with respect to each other in a longitudinal direction of the bracelet, said adjustable link comprising:

an adjustment mechanism; and a lock of the first half link that cooperates with a complementary lock of the second half link, and the lock and the complementary lock form a captive assembly, wherein the first half link comprises a through hole extending in the longitudinal direction in the first half link, the second half link comprises a threaded hole extending in the longitudinal direction in the second half link, and the through hole and the threaded hole are aligned in the longitudinal direction, wherein the adjustment mechanism comprises a screw that passes through the through hole and is screwed into the threaded hole to cause the first half link to move in translation with respect to the second half link in the longitudinal direction when the screw is implemented, and wherein the lock covers at least a portion of the screw in the longitudinal direction.

2. The adjustable link according to claim 1, wherein the first half link comprises a structure to axially hold the screw so that the screw is immovable in translation in the longitudinal direction.

3. The adjustable link according to claim 1, wherein the adjustment mechanism comprises an elastic return mechanism disposed between the through hole and the threaded hole, so as to maintain in position the first half link with respect to the second half link.

4. The adjustable link according to claim 1, wherein the adjustment mechanism has an adjustment travel comprised between 0 mm and 3 mm.

5. A bracelet strand wherein the strand comprises at least one adjustable link according to claim 1.

6. An adjustable link for a bracelet, comprising at least a first half link and at least a second half link arranged to be assembled to move with respect to each other in a longitudinal direction of the bracelet, said adjustable link comprising:
- an adjustment mechanism; and
- a lock of the first half link that cooperates with a complementary lock of the second half link, and the lock and the complementary lock form a captive assembly,
- wherein the first half link comprises a through hole extending in the longitudinal direction in the first half link, the second half link comprises a threaded hole extending in the longitudinal direction in the second half link, and the through hole and the threaded hole are aligned in the longitudinal direction,
- wherein the adjustment mechanism comprises a screw that passes through the through hole and is screwed into the threaded hole to cause the first half link to move in translation with respect to the second half link in the longitudinal direction when the screw s implemented, and
- wherein the threaded hole comprises a first section of diameter D, and a second section of diameter d smaller than the diameter D of the first section, the first section forming a housing for a first end of an elastic return mechanism so as to rest on the second half link.

7. The adjustable link according to claim 1, wherein the first half link comprises, in immediate proximity to the through hole, a countersunk or recessed portion configured to receive a head of the screw.

8. The adjustable link according to claim 7, wherein the countersunk portion comprises a blocking structure for the screw configured to cooperate with a complementary blocking structure for the screw.

9. An adjustable link for a bracelet, comprising at least a first half link and at least a second half link arranged to be assembled to move with respect to each other in a longitudinal direction of the bracelet, said adjustable link comprising:
- an adjustment mechanism; and
- a lock of the first half link that cooperates with a complementary lock of the second half link, and the lock and the complementary lock form a captive assembly,
- wherein the first half link comprises a through hole extending in the longitudinal direction in the first half link, the second half link comprises a threaded hole extending in the longitudinal direction in the second half link, and the through hole and the threaded hole are aligned in the longitudinal direction,
- wherein the adjustment mechanism comprises a screw that passes through the through hole and is screwed into the threaded hole to cause the first half link to move in translation with respect to the second half link in the longitudinal direction when the screw is implemented, and
- wherein the lock and the complementary lock comprise a catch, integral with the first half link, and a recessed part, integral with the second half link, configured to receive the catch and to form the captive assembly between the first half link and the second half link.

10. The adjustable link according to claim 9, wherein the catch is elastically deformable to allow the first half link and the second half link to be disassembled.

11. The adjustable link according to claim 9, wherein the catch is movable in the recessed part in the longitudinal direction of the bracelet.

* * * * *